(12) United States Patent
Wakao et al.

(10) Patent No.: US 6,845,838 B2
(45) Date of Patent: Jan. 25, 2005

(54) FOUR-WHEEL DRIVE VEHICLE

(75) Inventors: Hisaaki Wakao, Kariya (JP); Fukami Imai, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/420,891

(22) Filed: Apr. 23, 2003

(65) Prior Publication Data

US 2004/0016585 A1 Jan. 29, 2004

(30) Foreign Application Priority Data

Apr. 23, 2002 (JP) .......................................... 2002-121056

(51) Int. Cl.⁷ ............................................. B60K 17/35
(52) U.S. Cl. ........................ 180/248; 180/233; 701/69; 701/70
(58) Field of Search ................................ 180/247–249, 180/233, 197; 701/69, 87–89

(56) References Cited

U.S. PATENT DOCUMENTS

| | | | | |
|---|---|---|---|---|
| 5,737,714 | A | * | 4/1998 | Matsuno et al. ............. 701/89 |
| 6,094,614 | A | * | 7/2000 | Hiwatashi .................... 701/89 |
| 6,208,929 | B1 | * | 3/2001 | Matsuno et al. ............. 701/89 |
| 6,393,351 | B2 | * | 5/2002 | Frediani et al. ............. 701/69 |
| 6,449,552 | B2 | * | 9/2002 | Ohba et al. .................. 701/89 |
| 6,453,228 | B1 | * | 9/2002 | Shimada ...................... 701/89 |
| 6,604,595 | B2 | * | 8/2003 | Sakakiyama ................ 180/233 |
| 6,634,451 | B2 | * | 10/2003 | Sakakiyama ................ 180/197 |

* cited by examiner

Primary Examiner—Lesley D. Morris
Assistant Examiner—L. Lum
(74) Attorney, Agent, or Firm—Oblon, Spivak, McClelland, Maier & Neustadt, P.C.

(57) ABSTRACT

A four-wheel drive vehicle provides a torque distribution clutch mechanism which directly transmits the driving force generated from the engine to one of two front wheels or two rear wheels, and which transmits it to the other wheels therethrough in order to control the engaging force in accordance with a traveling status of the four-wheel drive vehicle. The vehicle further comprises a tight corner judging structure, a normal mode setting structure, a low friction road judging structure and a tight mode setting structure. The tight corner judging structure judges whether the vehicle travels at a large turning angle or not, and the normal mode setting structure sets a normal mode to control the engaging force when it is judged by the tight corner judging structure that the vehicle does not travel at the large turning angle. Further, the low friction road judging structure judges whether the vehicle travels on a low friction road or not, and the tight mode setting structure for setting a tight mode to control the engaging force in a condition that it is judged by the tight corner judging structure that the vehicle travels at the large turning angle when it is judged by the low friction road judging structure that the vehicle dose not travel on the low friction road.

5 Claims, 6 Drawing Sheets

FOUR-WHEEL DRIVE VEHICLE

INCORPORATION BY REFERENCE

The present application claims priority under 35 U.S.C. Section 119 to Japanese Patent Application No. 2002-121056 filed on Apr. 23, 2002. The content of this application is incorporated herein by reference in their entirety.

FIELD OF THE INVENTION

The present invention relates to a four-wheel drive vehicle. More particularly, the present invention relates to such a four-wheel drive vehicle in which a driving force generated in an engine is directly transmitted to one of front wheels or rear wheels, and is transmitted to the other wheels through a torque distribution clutch mechanism, an engaging force of which is controlled in accordance with a traveling status of the vehicle to distribute the driving force from the engine to the front and rear wheels.

BACKGROUND OF THE INVENTION

Conventionally, it is known such a four-wheel drive (referred to as "4WD" hereinafter) vehicle wherein an engaging force of a torque distribution clutch mechanism is adjustably controlled based upon a rotational difference between front wheels and rear wheels. FIG. 7 presents an example of a control map used in such a conventional 4WD vehicle, in which "T" of an axis of ordinates represents an engaging force of the torque distribution clutch mechanism, and "ΔN" of an axis of abscissas represents the rotational difference between the front wheels and the rear wheels.

Herein, in a case that the vehicle acceleratingly starts on a low friction road such as a snow road or crust road, the engaging force T of the torque distribution clutch mechanism is increased by using the control map shown by a one-dotted line A of FIG. 7. Therefore, steady acceleration and start can be performed in the 4WD vehicle.

However, in a case that the 4WD vehicle travels at a low speed at a large turning angle under condition that the engaging force of the torque distribution clutch mechanism is increased, the rotational difference between the front wheels and the rear wheel cannot be absorbed. As a result, this unabsorption of the rotational difference causes to generate a tight corner braking phenomenon (the vehicle difficulty turns so as to have activated the brakes). By this phenomenon, it is adopted such a map B that the gradient of the engaging force is easy in addition to the steep gradient of the map A. In such a situation, when a large steering angle is detected by a steering angle sensor and the like, it is judged to be on a tight corner state, so that the generation of the tight corner braking phenomenon can be prevented by using of the map B.

However, even if the 4WD vehicle travels on the snow road or the crust road that the 4WD vehicle easily slips, the engaging force of the torque distribution mechanism is diminished to change the control map to the map B when it is judged to be on the tight corner state. Therefore, the stability and traveling ability of the 4WD vehicle is decreased.

SUMMARY OF THE INVENTION

Accordingly, an object of the present invention is to provide a four-wheel drive vehicle that is capable of improving the stability and traveling ability thereof even if it travels on a low friction road with prevention of the tight corner braking phenomenon.

To perform the above-mentioned object, a four-wheel drive vehicle according to the present invention provides a torque distribution clutch mechanism which directly transmits the driving force generated from the engine to one of tow front wheels or two rear wheels, and which transmits it to the other wheels therethrough in order to control the engaging force in accordance with a traveling status of the four-wheel drive vehicle. The vehicle further comprises a tight corner judging means, a normal mode setting means, a low friction road judging means and a tight mode setting means.

In thus-configured vehicle, the tight corner judging means judges whether the vehicle travels at a large turning angle or not, and the normal mode setting means sets a normal mode to control the engaging force when it is judged by the tight corner judging means that the vehicle does not travel at the large turning angle. Further, the low friction road judging means judges whether the vehicle travels on a low friction road or not, and the tight mode setting means for setting a tight mode to control the engaging force in a condition that it is judged by the tight corner judging means that the vehicle travels at the large turning angle when it is judged by the low friction road judging means that the vehicle dose not travel on the low friction road.

With this configuration, the engaging force of the torque distribution clutch mechanism is set to the normal mode when it is judged that the vehicle travels on the low friction road. In other words, the engaging force of the torque distribution clutch mechanism is set to the normal mode even when the vehicle travels at the large turning angle. As a result, the vehicle is controlled with the normal mode, so that the driving force from the engine is adjustably distributed to the four wheels even through the torque distribution clutch mechanism if the vehicle travels at the large turning angle on the low friction road such snow road, crust road, sandy road and the like. Accordingly, the improved stability and traveling ability can be realized.

The four-wheel drive vehicle according to the present invention further comprises a wheel speed sensor provided at each of the four wheels for detecting wheel speed of the each wheel. With the provision of the wheel speed sensors, a rotational radius of the vehicle is calculated from the wheel speeds detected by the speed sensors is larger than a predetermined radius, and also a rotational difference between the front wheels and the rear wheels is calculated from the wheel speeds detected by the wheel speed sensors. Accordingly, whether the vehicle travels or not on the low friction road can be judged precisely.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

LIST OF DESIGNATORS

| | |
|---|---|
| 10 | four-wheel drive vehicle |
| 12 | engine (motor) |
| 14 | transmission |
| 15 | front differential |
| 18 | propeller shaft |
| 19 | clutch mechanism |
| 20 | coupling (torque distribution clutch mechanism) |
| 25 | rear differential |
| 50 | electric control circuit |
| 52 | CPU (Central Processing Unit) |
| 64a | acceleration pedal sensor |

DETAILED DESCRIPTION OF THE PREFERRED EMBODIMENTS

Figure 1:
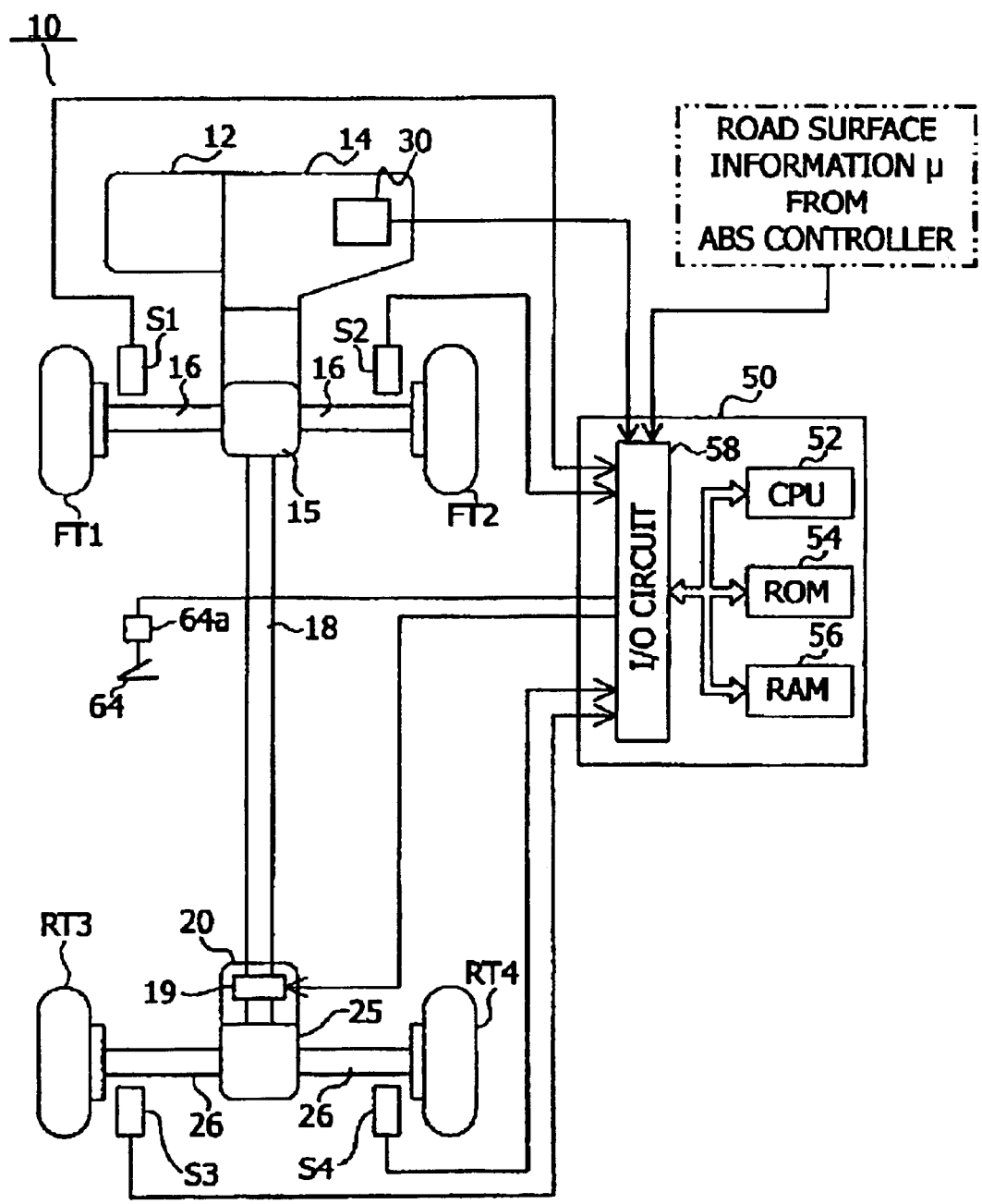
FIG. 1 is an explanatory view showing a general construction of a four-wheel drive vehicle according to a first embodiment of the present invention.

Embodiments according to the present invention will be explained hereinafter with reference to the drawings.
[First Embodiment]
FIG. 1 is an explanatory view showing a general construction of a four-wheel drive vehicle according to a first embodiment of the present invention. In the four-wheel drive vehicle 10, a driving torque from an engine 12 applies to front wheels FT1 and FT2, and is transmitted to rear wheels RT3 and RT4 in a condition that the driving torque is adjusted in accordance with a traveling status of the vehicle 10. In a transmission 14 assembled aside of the engine 12, there is installed a front differential 15 in which a driving force from the engine 12 is outputted to an axle shaft 16 to drive the front wheels FT1 and FT2, and is transmitted to a propeller shaft 18. The propeller shaft 18 is connected to a rear differential 25 through a coupling 20. The coupling 20 provides a clutch mechanism 19 and is configured so as to be able to adjust the transmission of torque. The clutch mechanism 19 is controlled by a signal from an electric control circuit 50, so that the transmission torque can be adjusted. Besides, a torque distribution clutch mechanism consist of the clutch mechanism 19 and the coupling 20.

The driving force from the coupling 20 drives the rear wheels RT3 and RT4 through the rear differential 25 and an axle shaft 26. At the front and rear wheels FT1, FT2, TR3 and RT4, there are arranged wheel speed sensors S1, S2, S3 and S4 for detecting a wheel speed of the wheels, respectively.

The electric control circuit 50, as mentioned above, controls the coupling 20. The electric control circuit 50 is composed of a CPU 52 for executing a variety of calculation and control, a ROM 54 for storing control programs, a RAM 56 for serving as work areas of the CPU 52, and an input/output circuit 58. The electric control circuit 50 controls the torque transmitting force of the coupling 20 by detecting a slipping state between the front and rear wheels based upon output signals from the wheel speed sensors S1, S2, S3 and S4.

Into the input/output circuit 58 of the electric control circuit 50, there is inputted an accelerator operation signal from an acceleration pedal sensor 64a attached on an acceleration pedal 64.

Figure 3A:
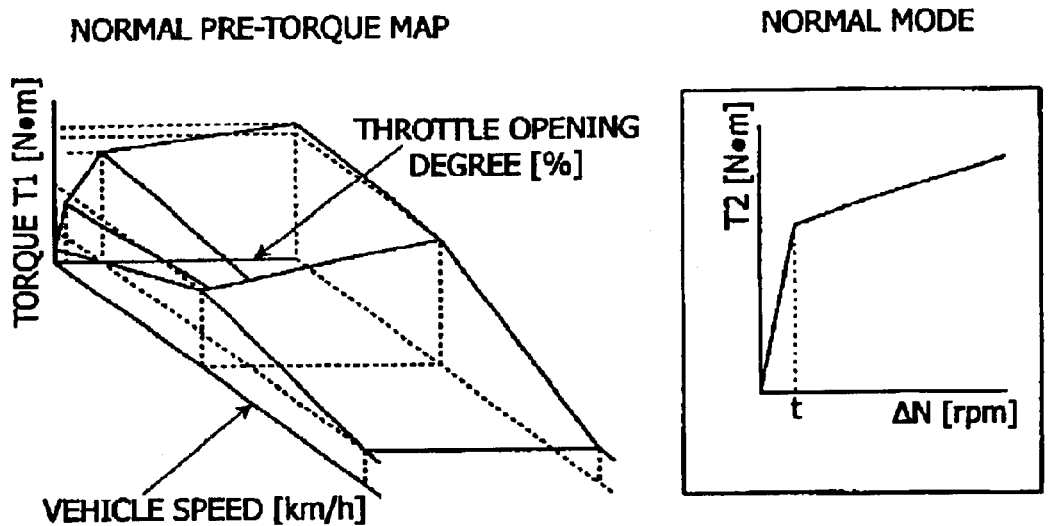
FIG. 3(A) is an explanatory view of a normal pre-torque map and a normal mode map used to organize an engaging force control map referred to in the CPU 52 according to the first embodiment of the present invention.
Figure 3B:
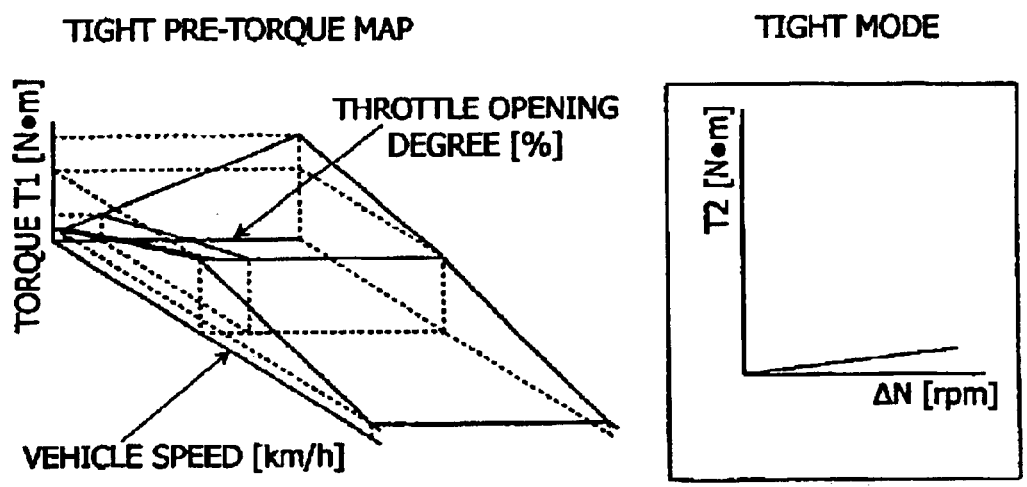
FIG. 3(B) is an explanatory view of a tight pre-torque map and a tight mode map used to organize an engaging force control map referred to in the CPU 52 according to the first embodiment of the present invention.
Figure 7:
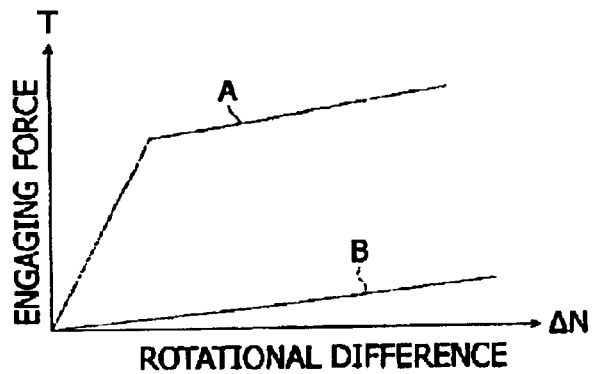
FIG. 7 is an explanatory view showing an example of a control map used in a conventional four-wheel drive vehicle.

Next, an engaging force control map will be explained with reference to FIG. 3(A) and FIG. 3(B) showing its contexture that is referred to when the CPU 52 executes the computer program for controlling the coupling 20. The engaging force control map is organized from a normal pre-torque map and a normal mode map represented in FIG. 3(A) and from a tight pre-torque map and a tight mode map represented in FIG. 3(B). Each of the normal and tight pre-torque maps has a torque T (referred to as torque T1 in the pre-torque maps and T2 in the mode maps), a throttle opening degree and a vehicle speed as parameters. Namely, the torque T1 is led from the throttle opening degree (%) and the vehicle speed. Herein, the throttle opening degree represents the degree of depress amount of the acceleration pedal 64 detected by the acceleration pedal sensor 64a, changes from 0% to 100%, and is obtained by the acceleration operation signal from the acceleration pedal sensor 64a. Further, the vehicle speed is calculated from an average of wheel speeds of the rear wheels RT3 and RT4 detected by the wheel speed sensors S3 and S4. In each of the normal and tight mode maps, an axis of ordinates represents an engaging force T2 (torque: N·m), and an axis of abscissas represents a rotational difference ΔN (rpm) that is calculated from a difference between the average of the wheel speeds of the front wheels FT1 and FT2 and the average of the wheel speeds of the rear wheels RT3 and RT4. In such a contexture, a normal state control is performed by a combination of the normal pre-torque map and the normal mode map, and a tight state control is performed by a combination of the tight pre-torque map and the tight mode map. Besides, the normal and tight mode maps may be so called as an engaging force control map.

The normal mode map shown in FIG. 3(A) is of the engaging force control map used when the four-wheel drive vehicle 10 travels in a normal condition, and has a characteristic that the engaging force T2 increases in accordance with the rotational difference ΔN. Namely, the engaging force T can be increased as the slip increases between the front and rear wheels, so that the driving force generated from the engine is distributed to the rear wheels in accordance with the engaging force T, whereby the slip of the front wheel is prevented and a steady acceleration of the vehicle is performed.

The tight mode map shown in FIG. 3(B) is of the engaging force control map used when the four-wheel drive vehicle 10 is turned on a tight corner, and has a characteristic that the engaging force T is gradually increased relative to the increase of the rotational difference ΔN. Namely, the tight mode map is used when the vehicle 10 travels at a large turning angle, the engaging force T is diminished even if the rotational difference ΔN is large in a turning state of the vehicle 10. Therefore, a tight corner braking phenomenon can be prevented.

Figure 2:
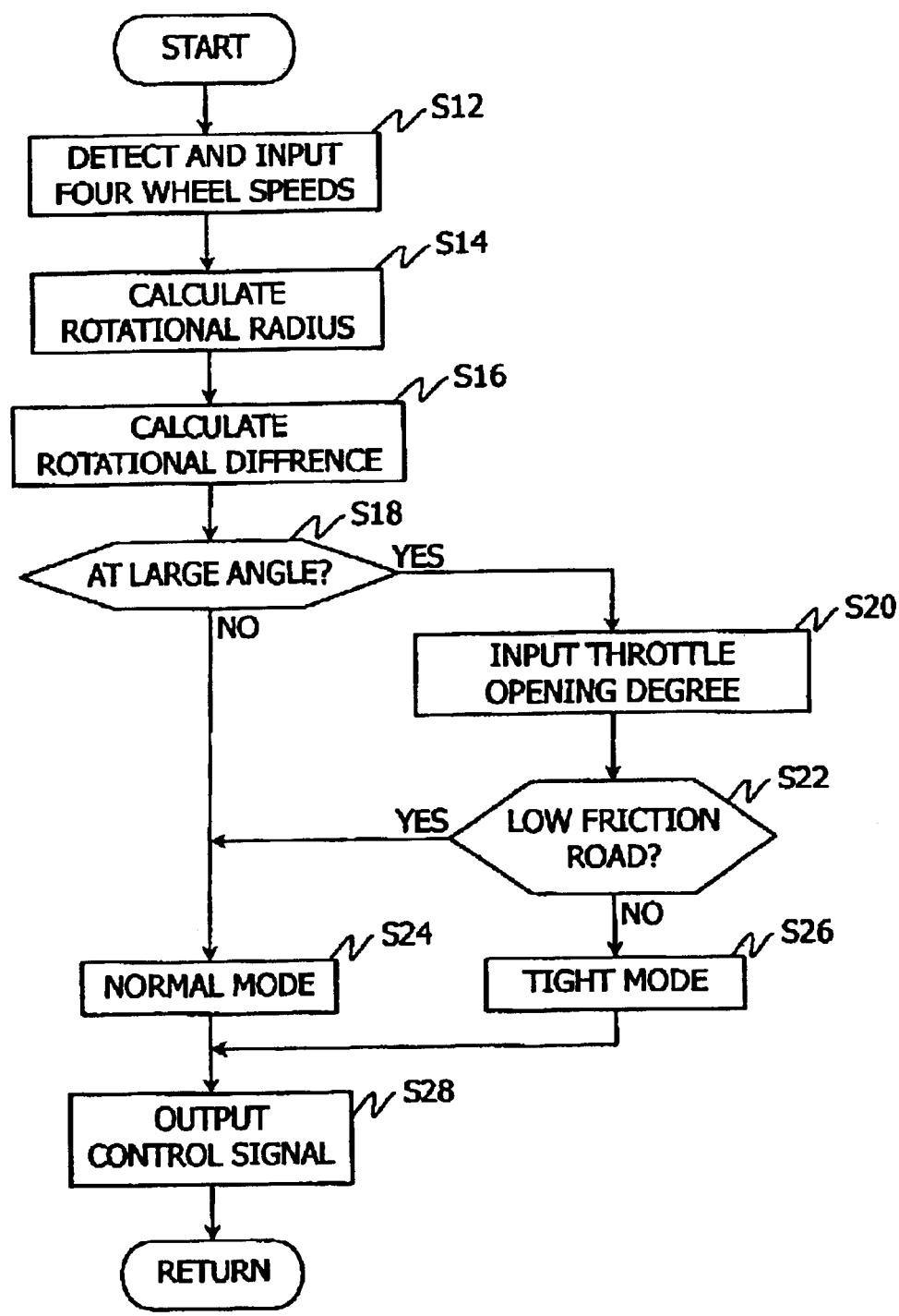
FIG. 2 is a flowchart showing a processing flow executed in a CPU 52 to control an engaging force T according to the first embodiment of the present invention.
Figure 4:
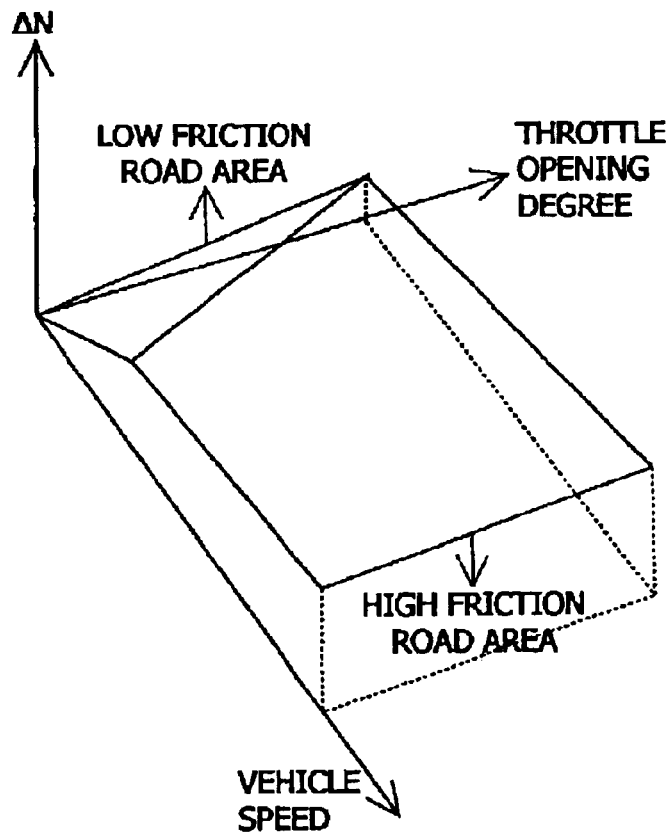
FIG. 4 an explanatory view a contexture of a low friction road judging map referred in the CPU 52 according to the first embodiment of the present invention.

Next, a contexture of a low friction road judgment map used in the CPU 52 will be explained hereinafter with reference to FIG. 4. In this embodiment, whether a low friction road is or not is judged from three parameters of the rotational difference ΔN between the front and rear wheels, the vehicle speed and the throttle opening degree by referring to the low friction road judgment map. It is judged to be on the low friction road in a case that the rotational difference ΔN is relatively large when the vehicle speed is low relative to the throttle opening degree. On the other hand, it is judged to be on a high friction road in a case that the rotational difference ΔN is relatively small when the vehicle speed is high relative to the throttle opening degree Next, process flows executed to control the engaging force T by the CPU 52 will be explained hereinafter with reference to a flow chart shown in FIG. 2.

Into the CPU 52 of the electric control circuit 50, there are inputted rotational speeds ω1, ω2, ω3 and ω4 of the front wheels FT1 and FT2 and of the rear wheels RT3 and RT4 from the wheel speed sensors S1, S2, S3 and S4 (step S12). In step S14, a turning radius of the vehicle 10 is calculated from the rotational speeds ω1, ω2, ω3 and ω4. Next, the rotational difference ΔN between the front and rear wheels is calculated from the rotational speeds ω1, ω2, ω3 and ω4 in step S16. In step S18, it is judged to be a large turning state when the turning radius calculated in step S14 is smaller than predetermined turning radius (10 m, for example). Namely, it is judged whether the vehicle travels at the large tuning angel in step S18.

In a case that the judgment is not the large turning state (No in step S18), the engaging force T is, in step S24, determined by using the aforementioned tight mode map with reference to FIG. 3(B). After the determination in step S24, a control signal is outputted to control the clutch mechanism 19.

On the other hand, in a case that the judgment is the large turning state (Yes in step S18), the throttle opening degree is calculated in step S20 after the accelerator operation signal from the accelerator pedal sensor 64a attached on the accelerator pedal 64 is inputted into the CPU 52 through the input/output circuit 58. Herein, whether the low friction road is or not is, in step S22, judged from the aforementioned vehicle speed, throttle opening degree and rotational difference ΔN between the front and rear wheels with reference to the above-mentioned low friction road judgment map shown in FIG. 4.

In a case that the judgment is not the low friction road (No in step S22), the engaging force T is, in step S26, determined by using the aforementioned tight mode map with reference to FIG. 3(B). After the determination in step S26, the control signal is outputted to control the clutch mechanism 19. With this control process, the engaging force T of the clutch mechanism 19 is diminished, so that the tight corner braking phenomenon can be prevented.

On the other hand, in a case that the judgment is the low friction road (Yes in step S22), the engaging force T is, in step S24, determined by using the aforementioned normal mode map with reference to FIG. 3(A). After the determination in step S24, the control signal is outputted to control the clutch mechanism 19. With this control process, the driving force is distributed to the four wheels (FT1, FT2, RT3 and RT4) by increasing the engaging force T of the clutch mechanism 19 corresponding to the rotational difference ΔN between the front wheels and the rear wheels. Accordingly, remarkable stability and traveling ability can be realized when the vehicle 10 travels at a low speed of the vehicle on the low friction road such snow road or sandy road.

[Second Embodiment]

Subsequently, a four-wheel drive vehicle according to a second embodiment of the present invention will be explained hereinafter. In the above-mentioned first embodiment, whether the low friction road is or not is judged in the CPU 52. In contrast with the first embodiment, a traveling mode selection switch 30 is provided with the vehicle to select a gear (speed) change pattern of an automatic transmission (14) in the second embodiment. Further, a snow road traveling mode is provided in the traveling mode selection switch 30. With this configuration, the CPU 52 for the driving force distribution operation judges whether the low friction road is or not with the selection of the snow road traveling mode in the traveling mode selection switch 30.

Figure 5:
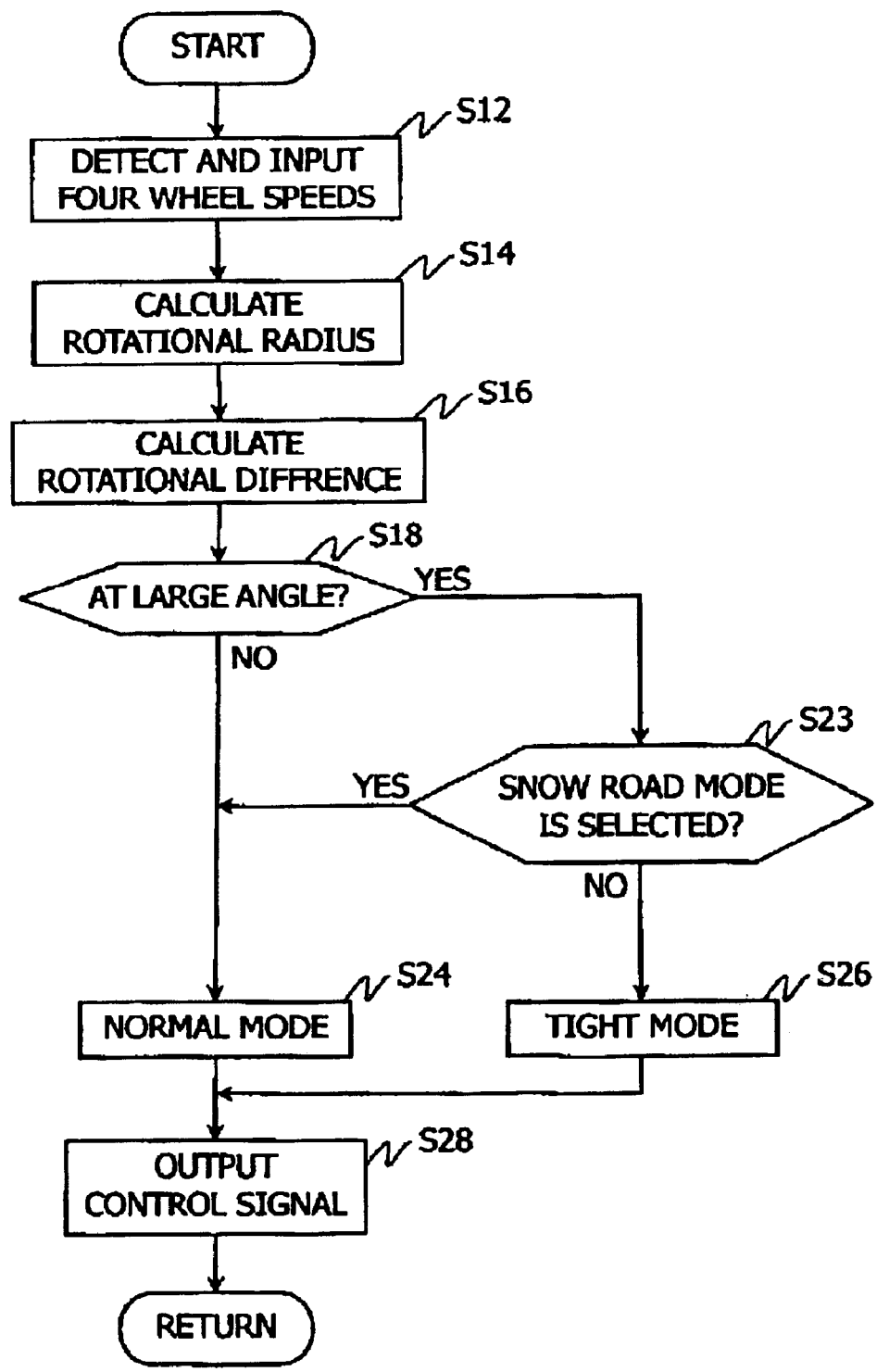
FIG. 5 is a flowchart showing a processing flow executed in the CPU 52 to control an engaging force T according to a second embodiment of the present invention.
Figure 6:
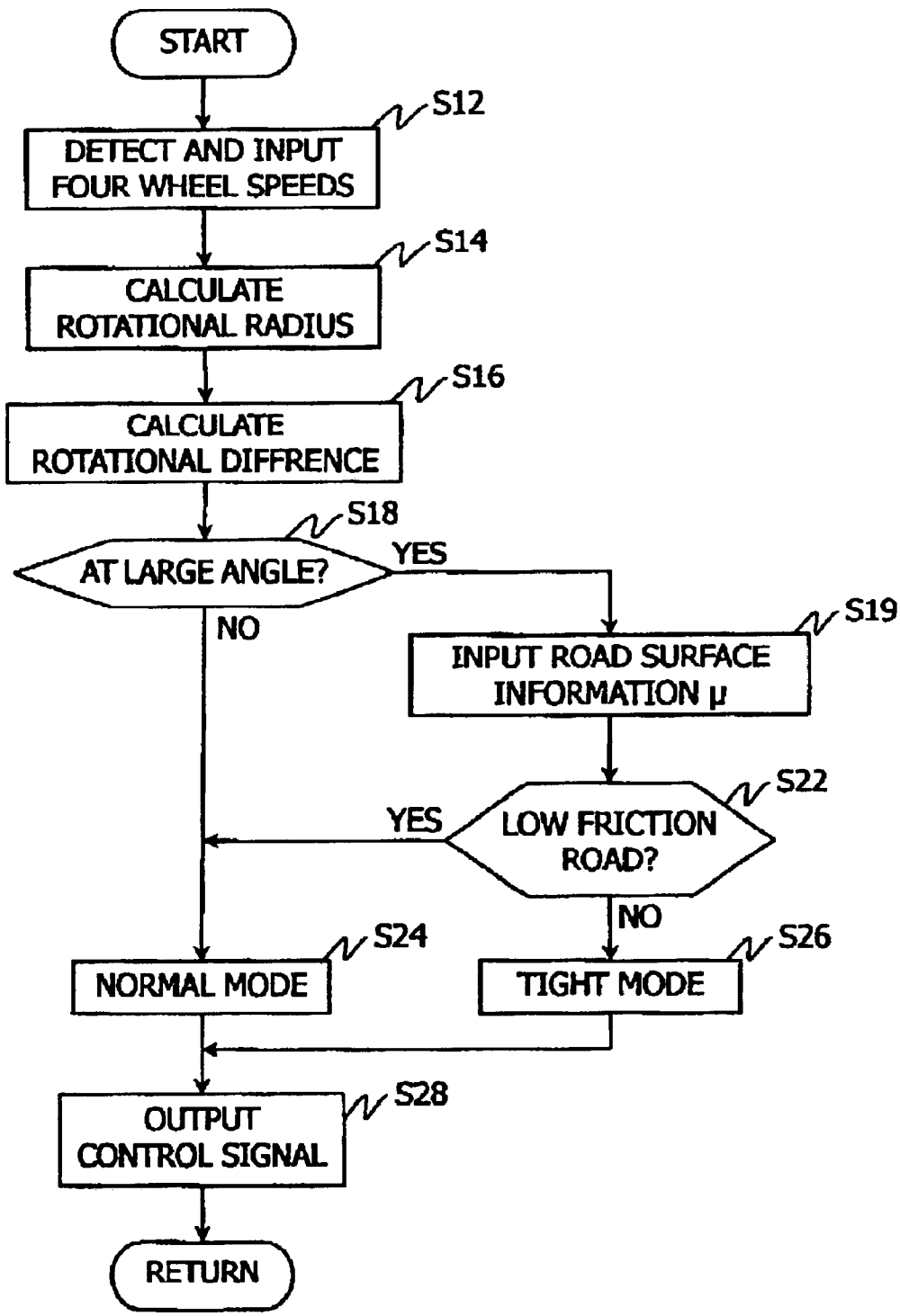
FIG. 6 is a flowchart showing a processing flow executed in the CPU 52 to control an engaging force T according to a third embodiment of the present invention.

A process flow executed to control the engaging force T by the CPU 52 in the second embodiment will be explained hereinafter with reference to a flow chart shown in FIG. 5. In FIG. 5, the processing executed in steps S12–S16 are same as that of the aforementioned first embodiment shown in FIG. 2, so that the explanations thereabout is omitted herein In step S18, whether the large turning state (tight corner) is or not is judged by the CPU 52. In a case that the large turning state is not judged (No in step S18), the engaging force T is, in step S24, determined by using the aforementioned normal mode map shown in FIG. 3(A). As a result of this determination, a control signal is outputted to control the clutch mechanism 19 in step S28.

On the other hand, in a case that the large turning state is judged (Yes in step S18), it is in step S23 judged whether the snow road traveling mode is selected or not. In a case that the snow road traveling mode is not selected (No in step S23), the engaging force T is, in step S26, determined by using the aforementioned tight mode map shown in FIG. 3(B), whereby a control signal is outputted to control the clutch mechanism 19 in step S28. As a result of this control, the engaging force T of the clutch mechanism 19 is reduced, so that the tight corner braking phenomenon can be prevented.

In a case of the selection of the snow road traveling mode in the traveling mode selection switch (Yes in step S23), the engaging force T is, in step S24, determined by using the aforementioned normal mode map shown in FIG. 3(A), whereby a control signal is outputted to control the clutch mechanism 19 in step S28. Namely, the driving force is distributed to the four wheels (FT1, FT2, RT3 and RT4) by increasing the engaging force T of the clutch mechanism 19 corresponding to the rotational difference ΔN between the front wheels and the rear wheels. Accordingly, remarkable stability and traveling ability can be realized when the vehicle 10 travels on the low friction road such snow road or sandy road in the large turning state.

[Third Embodiment]

Subsequently, a four-wheel drive vehicle according to a third embodiment of the present invention will be explained hereinafter. In the above-mentioned first embodiment, whether the low friction road is or not is judged in the CPU 52. In contrast with the first embodiment, the electric control circuit 50 for the driving force distribution operation obtains such information corresponding to whether the vehicle travels or not on the low friction road from a control device for an ABS (Anti Break Skid) installed in the vehicle.

A process flow executed to control the engaging force T by the CPU 52 in the third embodiment will be explained hereinafter with reference to a flow chart shown in FIG. 5. In FIG. 5, the processing executed in steps S12–S16 are same as that of the aforementioned first embodiment shown in FIG. 2, so that the explanations thereabout is omitted herein.

In step S18, whether the large turning state (tight corner) is or not is judged by the CPU 52. In a case that the large turning state is not judged (No in step S18), the engaging force T is, in step S24, determined by using the aforementioned normal mode map shown in FIG. 3(A). As a result of this determination, a control signal is outputted to control the clutch mechanism 19 in step S28.

On the other hand, in a case that the large turning state (tight corner) is judged (Yes in step S18), a road surface information $\mu$ (friction between a road surface and the surface of the wheel) is inputted from the control device of the ABS to the CPU 52 through the input/output circuit 58 (in step S19). When the road surface is high $\mu$ (the road surface information $\mu$ is high)(No in step S22), the engaging force T is, in step S26, determined by using the aforementioned tight mode map shown in FIG. 3(B), whereby a control signal is outputted to control the clutch mechanism 19 in step S28. As a result of this control, the engaging force T of the clutch mechanism 19 is reduced, so that the tight corner braking phenomenon can be prevented.

When the judgment is the low friction road (the road surface information $\mu$ is low)(Yes in step S22), the engaging force T is, in step S24, determined by using the aforementioned normal mode map shown in FIG. 3(A), whereby a control signal is outputted to control the clutches 19 in step S28. Namely, the driving force is distributed to the four wheels (FT1, FT2, RT3 and RT4) by increasing the engaging force T of the clutch mechanism 19 corresponding to the rotational difference $\Delta N$ between the front and rear wheels. Accordingly, remarkable stability and traveling ability can be realized when the vehicle 10 travels on the low friction road such snow road or sandy road in the large turning state.

Herein, the road surface information $\mu$ may be obtained from ECU (Electric Control Unit) for engine control, for automatic transmission control and the like, and a navigation controller through an electric communication interface such as "CAN", "Been", "J1850" and the like. Further, the snow road information may be obtained from the road information broadcast, whereby the snow road traveling mode is selected by its snow road information.

Having described embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A four-wheel drive vehicle having a torque distribution clutch mechanism which directly transmits the driving force generated from the engine to one of two front wheels or two rear wheels, and which transmits it to the other wheels therethrough, said torque distribution clutch mechanism being configured to control the engaging force in accordance with a traveling status of the four-wheel drive vehicle, the vehicle comprising:

a tight corner judging means for judging whether the vehicle travels at a large turning angle or not;

a normal mode setting means for setting a normal mode to control the engaging force of said torque distribution clutch mechanism when it is judged by said tight corner judging means that the vehicle does not travel at the large turning angle;

a low friction road judging means for judging whether the vehicle travels on a low friction road or not; and a tight mode setting means for setting a tight mode to control the engaging force of said torque distribution clutch mechanism in a condition that it is judged by said tight corner judging means that the vehicle travels at the large turning angle when it is judged by said low friction road judging means that the vehicle does not travel on the low friction road.

2. A four-wheel drive vehicle according to claim 1, wherein the normal mode is set by said normal mode setting means to control the engaging force of said torque distribution clutch mechanism in a condition that it is judged by said tight corner judging means that the vehicle travels at the large turning angle when it is judged by said low friction road judging means that the vehicle travels on the low friction road.

3. A four-wheel drive vehicle according to claim 1 further comprising:

a wheel speed sensor provided at each of the four wheels for detecting wheel speed of the each wheel, wherein it is judged by said tight corner judging means that the vehicle travels at the large turning angle when a rotational radius calculated from the wheel speeds detected by said speed sensors is larger than a predetermined radius.

4. A four-wheel drive vehicle according to claim 3, wherein it is judged by said low friction road judging means that the vehicle travels on the low friction road when a rotational difference between the front wheels and the rear wheels calculated which difference is calculated from the wheel speeds detected by said wheel speed sensors is larger than a predetermined rotational difference.

5. A four-wheel drive vehicle according to claim 4 further comprising:

an acceleration pedal sensor for detecting a throttle opening degree of an acceleration pedal, wherein it is judged by said low friction road judging means that the vehicle travels on the low friction road when said rotational difference between the front wheels and the rear wheels is larger than the predetermined rotational difference and when the throttle opening degree detected by said acceleration pedal sensor is smaller than a predetermined throttle opening degree.

* * * * *